United States Patent
Ito et al.

(10) Patent No.: US 7,141,320 B2
(45) Date of Patent: Nov. 28, 2006

(54) FUEL CELL, ELECTRONIC DEVICE, PORTABLE TERMINAL AND CAMERA

(75) Inventors: Yoshihiro Ito, Saitama-ken (JP);
Naoyuki Nishino, Saitama-ken (JP);
Shuichi Ishii, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 401 days.

(21) Appl. No.: 10/641,290

(22) Filed: Aug. 15, 2003

(65) Prior Publication Data
US 2004/0197635 A1     Oct. 7, 2004

(30) Foreign Application Priority Data
Aug. 16, 2002  (JP)  ............................. 2002-237526
Mar. 31, 2003  (JP)  ............................. 2003-095057

(51) Int. Cl.
*H01M 8/00*   (2006.01)
*H01M 12/00*  (2006.01)

(52) U.S. Cl. ............................................. 429/12; 429/9
(58) Field of Classification Search .................... 429/9, 429/12
See application file for complete search history.

(56) References Cited

U.S. PATENT DOCUMENTS

| | | | |
|---|---|---|---|
| 6,506,513 B1 * | 1/2003 | Yonetsu et al. | 429/34 |
| 2002/0142206 A1 | 10/2002 | Hinokuma | |
| 2003/0134162 A1 * | 7/2003 | Gore et al. | 429/13 |

FOREIGN PATENT DOCUMENTS

| | | | |
|---|---|---|---|
| JP | 2003-036879 | * | 2/2003 |
| JP | 2003-36879 A | | 2/2003 |

* cited by examiner

*Primary Examiner*—Patrick Joseph Ryan
*Assistant Examiner*—Thomas H. Parsons
(74) *Attorney, Agent, or Firm*—Sughrue Mion, PLLC

(57) ABSTRACT

A fuel cell including, a cell unit which has a fuel electrode including a catalyst, an air electrode including a catalyst, and an electrolyte membrane which is sandwiched by the fuel electrode and the air electrode; a fuel chamber which is disposed at a fuel electrode side, and which stores fuel; an air chamber which is disposed at an air electrode side and to which air is supplied; and a recovery chamber in which a fuel-side by-product, which is generated by a catalytic reaction of the fuel at the fuel electrode, is recovered, wherein a colorant containing an indicator is provided inside of one of the fuel chamber and the recovery chamber.

18 Claims, 11 Drawing Sheets

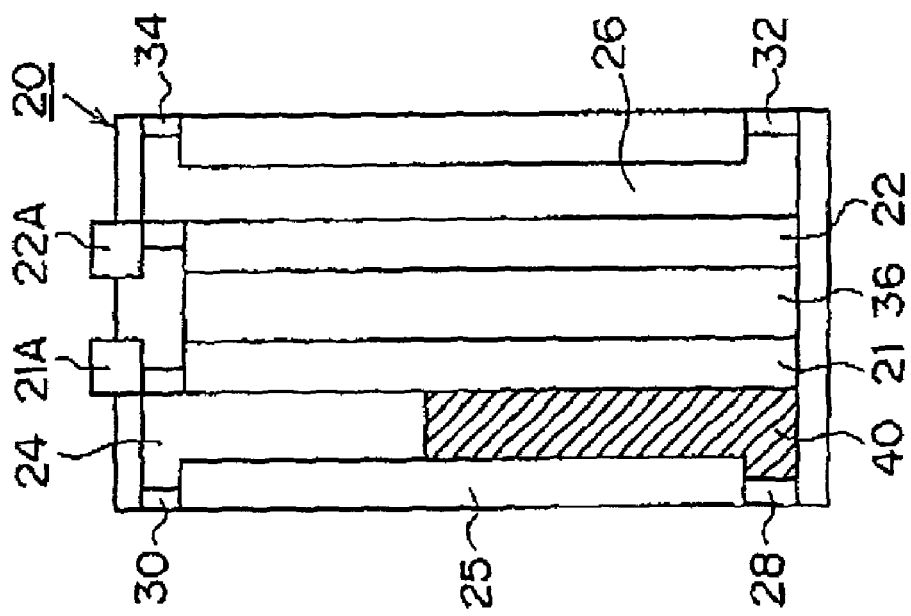
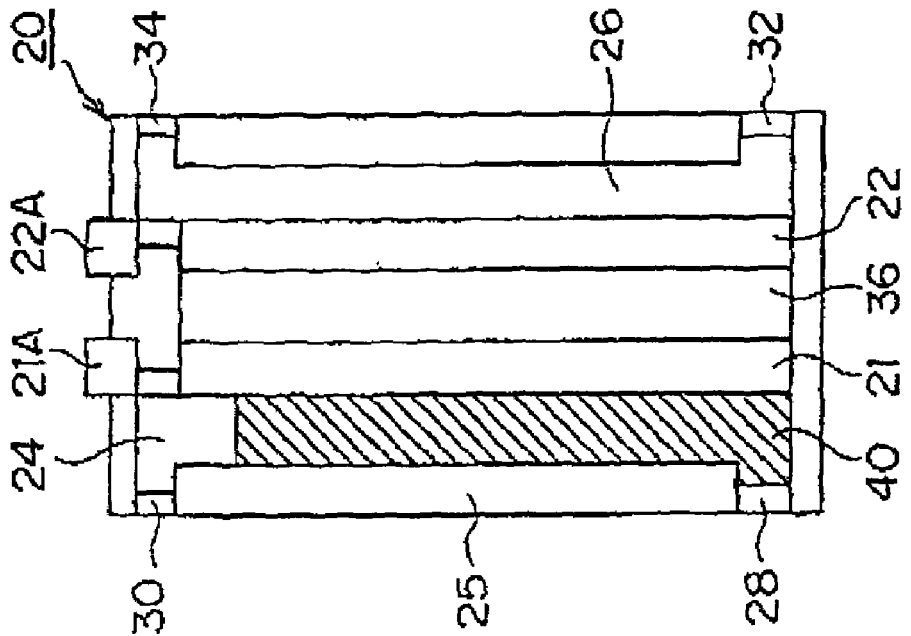

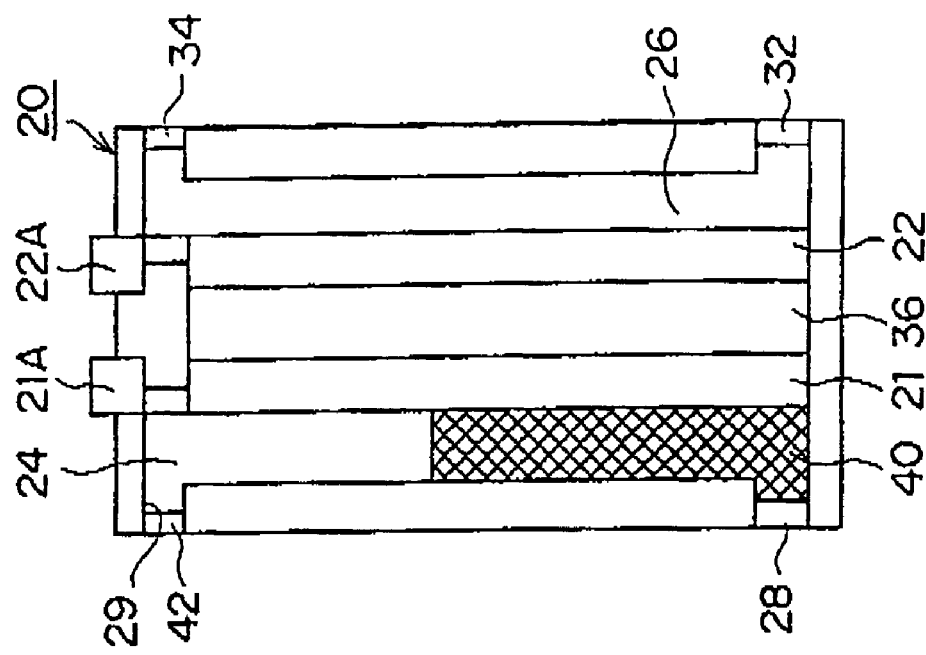
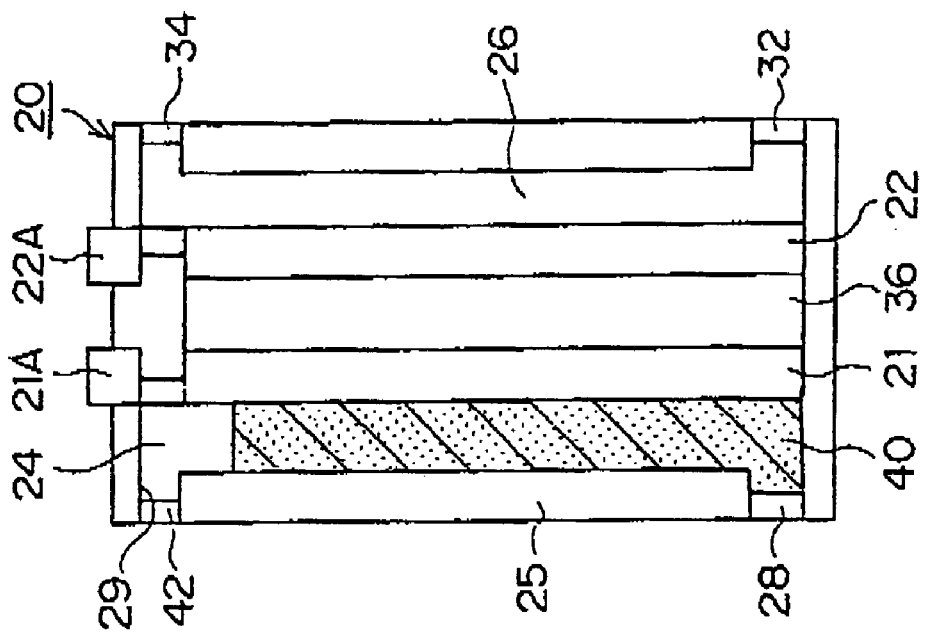

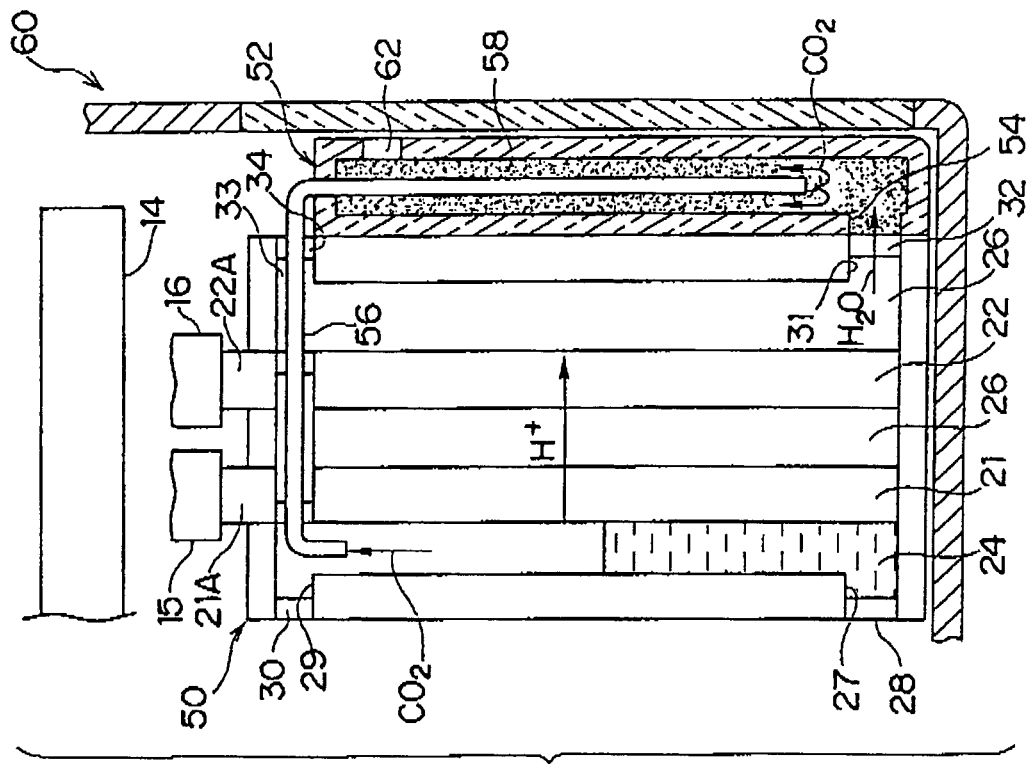
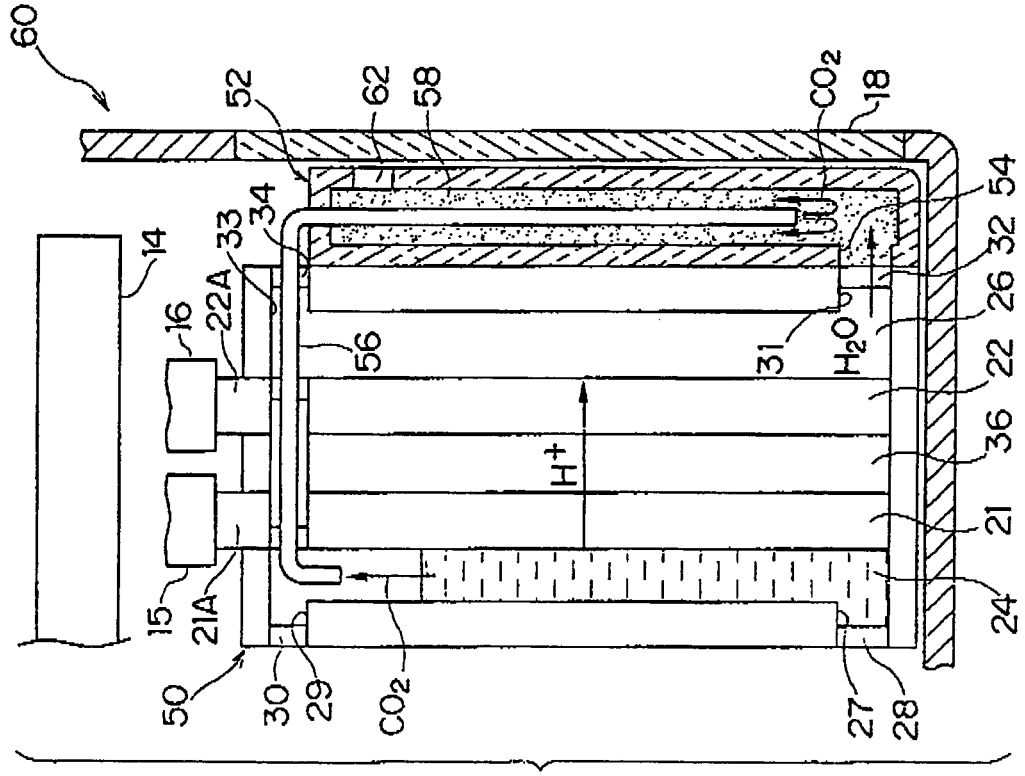

FUEL CELL, ELECTRONIC DEVICE, PORTABLE TERMINAL AND CAMERA

CROSS-REFERENCE TO RELATED APPLICATION

This application claims priority under 35 USC 119 from Japanese Patent Application Nos. 2002-237526 and 2003-95057, the disclosures of which are incorporated by reference herein.

BACKGROUND OF THE INVENTION

1. Field of the Invention

The present invention relates to a fuel cell such as a direct methanol fuel cell (DMFC) that uses a fuel, for example, methyl alcohol or methanol, and also concerns an electronic device, a portable terminal and a camera that are provided with such a fuel cell.

2. Description of the Related Art

The direct methanol fuel cell is a fuel cell of a type in which methanol ($CH_3OH$) mixed with water is directly supplied to a fuel electrode with oxygen being supplied to an air electrode in order to obtain electric energy via an electrolyte membrane such as a proton conductive membrane. Here, in the direct methanol fuel cell, carbon dioxide ($CO_2$) is generated by a catalytic reaction of the fuel electrode as a by-product and water ($2H_2O$) is generated by a catalytic reaction of the air electrode as a by-product. Moreover, the amount of consumption of the fuel, i.e., methanol, stored in a fuel chamber, is detected by using, for example, a method for detecting the change in color density of a pigment sealed in a recovery bag in which the by-product is recovered (for example, see Japanese Patent Application Laid-Open (JP-A) No. 2003-36879).

The above-mentioned methanol is a transparent colorless liquid, and is soluble to water or the like. Moreover, the methanol is poisonous to the human body, and even a dose of 8 to 10 g of methanol normally causes loss of one's eyesight, and a fatal dose is considered to be 20 to 100 g. For this reason, it is necessary to prevent people from drinking a fuel such as methanol by mistaken for water or the like. It is also necessary to prevent a different kind of fuel from being refueled by mistaken it as methanol.

In a fuel cell disclosed in JP-A No. 2003-36879, since the fuel is used as a transparent colorless liquid as it is, there is a danger of refueling a different kind of fuel by mistaken it as methanol as described above.

Moreover, it is difficult to conduct a visual detection based upon the color density, and requires a detection sensor, resulting remaining amount detection mechanism to be large-scaled.

SUMMARY OF THE INVENTION

In view of the aforementioned, an object of the present invention is to provide a fuel cell in which the consumption of the fuel is visually confirmed easily, and an electronic device and a camera using such a fuel cell.

A first aspect of the present invention provides a fuel cell comprising: a cell unit which has a fuel electrode including a catalyst, an air electrode including a catalyst, and an electrolyte membrane which is sandwiched by the fuel electrode and the air electrode; a fuel chamber which is disposed at a fuel electrode side, and which stores fuel; an air chamber which is disposed at an air electrode side and to which air is supplied; and a recovery chamber in which a fuel-side by-product, which is generated by a catalytic reaction of the fuel at the fuel electrode, is recovered, wherein a colorant containing an indicator is provided inside of one of the fuel chamber and the recovery chamber.

In the above-mentioned fuel cell, a colorant containing an indicator is contained in one of the recovery chamber and the fuel chamber. The by-product of the fuel-side is recovered in the recovery chamber or is maintained in the fuel chamber, and the color of the indicator is changed in accordance with the amount of the fuel-side by-product. In this way, the user can easily recognize the remaining amount of the fuel.

In the fuel cell, at least one of the fuel chamber and the recovery chamber may include an outer wall which comprises a transparent member.

The user can confirm the change in color of the colorant visually through an outer wall of the transparent member.

Further, the fuel cell may further comprise a pressure-applying mechanism which applies pressure to the interior of at least one of the fuel chamber and the recovery chamber.

Pressure is applied to one of the interior of the fuel chamber and the recovery chamber by the pressure mechanism. Here, effects obtained from a case in which, for example, methanol is used as the fuel, a Bromothymol Blue solution (BTB solution) is used as the indicator and carbon dioxide is generated as the fuel-side by-product will be described. Here, the amount of dissolution of carbon dioxide to methanol or water contained in the BTB solution increases as the inner pressure of the fuel chamber or the recovery chamber increases, and the extent of acidity becomes high. For this reason, when the pressure mechanism applies a pressure to the interior of the fuel chamber or the recovery chamber, the color of methanol that is neutral turns from green to yellow.

Furthermore, the recovery chamber may be provided with a gas-liquid separation membrane.

Gas is allowed to flow into or emitted from the recovery chamber through a gas-liquid separation membrane attached to the recovery chamber. Therefore, since the gas, recovered in the recovery chamber, is discharged from the recovery chamber appropriately, it is possible to prevent the inner pressure of the recovery chamber from rising to an abnormal level. Consequently, it becomes possible to prevent the recovery chamber from bursting and also to prevent the gas from reversely flowing into the fuel electrode from the recovery chamber.

In this case, since the solution inside the recovery chamber is blocked by the gas-liquid separation membrane, it is possible to prevent the solution from leaking out of the recovery chamber.

A second aspect of the invention provides a fuel cell comprising: a cell unit which has a fuel electrode including a catalyst, an air electrode including a catalyst, and an electrolyte membrane which is sandwiched by the fuel electrode and the air electrode; a fuel chamber which is disposed at a fuel electrode side, and which stores fuel; an air chamber which is disposed at an air electrode side and to which air is supplied, wherein fuel to which a colorant is added is housed in the fuel chamber.

In the above-mentioned fuel cell, a fuel to which a colorant is added is stored in the fuel chamber. When the amount of fuel decreases as power is generated in the fuel cell, the amount of the colorant becomes relatively greater in comparison with the remaining amount of the fuel so that the concentration of the colorant becomes higher. The user can recognize the remaining amount of the fuel depending on the change in the concentration of the colorant.

A colorant, which is, for example, a Bromothymol Blue solution (BTB solution) or a litmus solution, is added to a fuel such as methanol. Thus, transparent colorless methanol is colored to green, purple, blue or the like.

Here, gasoline is colored to have a substantially orange color (yellowish red), and kerosene is colored to substantially faint yellow. Therefore, in the case when a fuel such as methanol is colored, the initial color of the fuel is set to a color that is different from the substantially orange color of gasoline and the substantially faint yellow color of kerosene.

For example, methanol, which is colored by a colorant such as the BTB solution and mixed with water, is stored in the fuel chamber. When the methanol is subjected to a catalytic reaction by the fuel electrode, carbon dioxide (gas) is generated, and the generated carbon dioxide dissolves in water in the methanol.

In other words, every time the methanol, that is, the fuel, is used, the amount of dissolution of carbon dioxide becomes higher, and the color of the fuel changes in response to the amount of consumption of the fuel. Since the color of the fuel changes depending on the consumption of the fuel, it is possible to easily confirm the amount of consumption of the fuel by visually recognizing the color of the fuel in addition to the liquid surface level of the fuel. Therefore, it is possible to make the device more convenient.

Moreover, a colorant used for identifying a fuel of a different kind is added to a designated fuel (for example, designated fuel such as methanol) to be supplied to a fuel cell so that it becomes possible to prevent a fuel of a different kind from being supplied erroneously.

In the second aspect, the gas is allowed to remain in the fuel chamber, and the fuel cell may further comprise a pressure-applying mechanism for applying pressure to the interior of the fuel chamber.

Here, the amount of dissolution of carbon dioxide to water in methanol increases as the pressure inside the fuel chamber increases, causing the acidity to become higher. For this reason, when the pressure-applying means applies a pressure to the inside of the fuel chamber, the color of methanol that is neutral is turned from green to yellow.

Carbon dioxide is dissolved in water contained the fuel inside the fuel chamber so that the indicator contained in the fuel is changed in its color. With this arrangement, it becomes possible to recognize the remaining amount of the fuel based upon the change in color of the indicator. Here, the "change in color", mentioned in this case, is not a change in color density, but a change in color, for example, from green to yellow, which can be visually recognized by the user easily. Here, when the indicator is a solution, carbon dioxide is also dissolved in water contained in the indicated.

A third aspect of the present invention provides a fuel cell comprising: a cell unit which has a fuel electrode including a catalyst, an air electrode including a catalyst, and an electrolyte membrane which is sandwiched by the fuel electrode and the air electrode; a fuel chamber which is disposed at a fuel electrode side, and which stores fuel; an air chamber which is disposed at an air electrode side and to which air is supplied; and a recovery chamber in which a fuel-side by-product, which is generated by a catalytic reaction of the fuel at the fuel chamber, is recovered, wherein an absorbing member which absorbs a colorant, is housed in the recovery chamber, and a color of the absorbing member derived from the colorant changes in accordance with an amount of the fuel-side by-product which has been recovered.

In the above-mentioned fuel cell, a fuel-side by-product generated by a catalytic reaction at the fuel electrode is recovered in the recovery section. A colorant such as the Bromothymol Blue solution (BTB solution) or the litmus solution is absorbed in the recovery section.

Moreover, for example, in the case when methanol is used as the fuel and carbon dioxide is the fuel-side by-product, carbon dioxide recovered in the recovery section is dissolved in water in the colorant, and absorbed by the absorbing member so that the color of the colorant is changed.

In other words, each time methanol, which is the fuel, is used, the amount of carbon dioxide to be absorbed in the absorbing member increases, with the result that the color of the absorbing member is changed in accordance with the amount of consumption of the fuel. Therefore, since the color of the fuel is changed in accordance with the amount of consumption of the fuel, it is possible to easily confirm the amount of consumption of the fuel by visually recognizing the color of the absorbing agent in addition to the liquid surface level of the fuel. Therefore, it is possible to make the device more convenient.

In the third aspect, the recovery chamber may recover an air-side by-product generated at the air electrode.

Since the air-side by-product, generated at the air electrode, is recovered in the recovery chamber, it is possible to mix the air-side by-product and the fuel-side by-product with each other in the recovery chamber. For example, in the case when the air-side by-product is water and the fuel-side by-product is carbon dioxide, carbon dioxide is dissolved in water in the recovery chamber.

Further, the recovery chamber may be provided with a gas-liquid separation membrane.

Gas is allowed to flow into or emitted from the recovery chamber through a gas-liquid separation membrane attached to the recovery chamber. Therefore, since the gas, recovered in the recovery chamber, is discharged from the recovery chamber appropriately, it is possible to prevent the inner pressure of the recovery chamber from rising to an abnormal level. Consequently, it becomes possible to prevent the recovery chamber from bursting and also to prevent the gas from reversely flowing to the fuel electrode or the air electrode from the recovery chamber.

In this case, since the solution inside the recovery chamber is blocked by the gas-liquid separation membrane, it is possible to prevent the solution from leaking out of the recovery chamber.

Carbon dioxide and water are recovered in the recovery chamber, and carbon dioxide is dissolved in water and are absorbed in the absorbing member so that the indicator is changed in its color. Thus, it becomes possible to recognize the remaining amount of the fuel based upon the change in color of the absorbing member.

Furthermore, the indicator may comprise a Bromothymol Blue solution.

Carbon dioxide is dissolved in the Bromothymol Blue solution (BTB solution) so that the BTB solution is changed in its color from green (or blue) to yellow. Thus, the user is allowed to visually recognize the change in color easily.

Moreover, the indicator may comprise a litmus solution.

Carbon dioxide is dissolved in the litmus solution to change the color of the litmus solution from purple (or blue) to red. For this reason, the user is allowed to visually confirm the change in color easily.

Further, at least one of the fuel chamber and the recovery chamber may have an outer wall which comprises a transparent member.

The user can visually recognize the change in color of the fuel or the water-absorbing member through an outer wall of the transparent member.

In the third aspect, the fuel cell may further comprise a detection mechanism, which detects the color of the colorant.

Since the change in color of the colorant is detected by the detection mechanism, it is possible to accurately confirm the time of refueling of the fuel or the like quickly.

An electronic device to which the fuel cell according to the fist aspect can be installed.

The portable terminal features that a fuel cell is made installable thereto.

With respect to an electronic device, a portable terminal and a camera, a fuel cell is also made attachable thereto. Therefore, upon application of the above-mentioned electronic device, portable terminal and camera, the change in color of the fuel or the like can be confirmed. Here, the electronic device and portable terminal are used as concepts including portable telephones, personal computers, Personal Digital Assistants (PDAs) and the like. Moreover, the camera is used as a concept including silver photograph type cameras, digital cameras, digital video cameras and portable telephones with an image-pickup function.

BRIEF DESCRIPTION OF THE DRAWINGS

FIG. 4A is a cross-sectional view showing a state in which a fuel chamber shown in FIGS. 1 and 3 is filled with methanol, water and a Bromothymol Blue solution.

FIG. 4B is a cross-sectional view showing a state in which a fuel chamber shown in FIGS. 1 and 3 is filled with methanol, water and a Bromothymol Blue solution.

FIG. 5A is a cross-sectional view showing a state in which a fuel chamber shown in FIGS. 1 and 3 is filled with methanol, water and a Litmus solution.

FIG. 5B is a cross-sectional view showing a state in which a fuel chamber shown in FIGS. 1 and 3 is filled with methanol, water and a Litmus solution.

FIG. 8A is a cross-sectional view showing the fuel cell of FIG. 7.

FIG. 8B is a cross-sectional view showing the fuel cell of FIG. 7.

DETAILED DESCRIPTION OF THE INVENTION

Hereinafter, a fuel cell 20 relating to a first embodiment of the present invention will be described.

Figure 1:
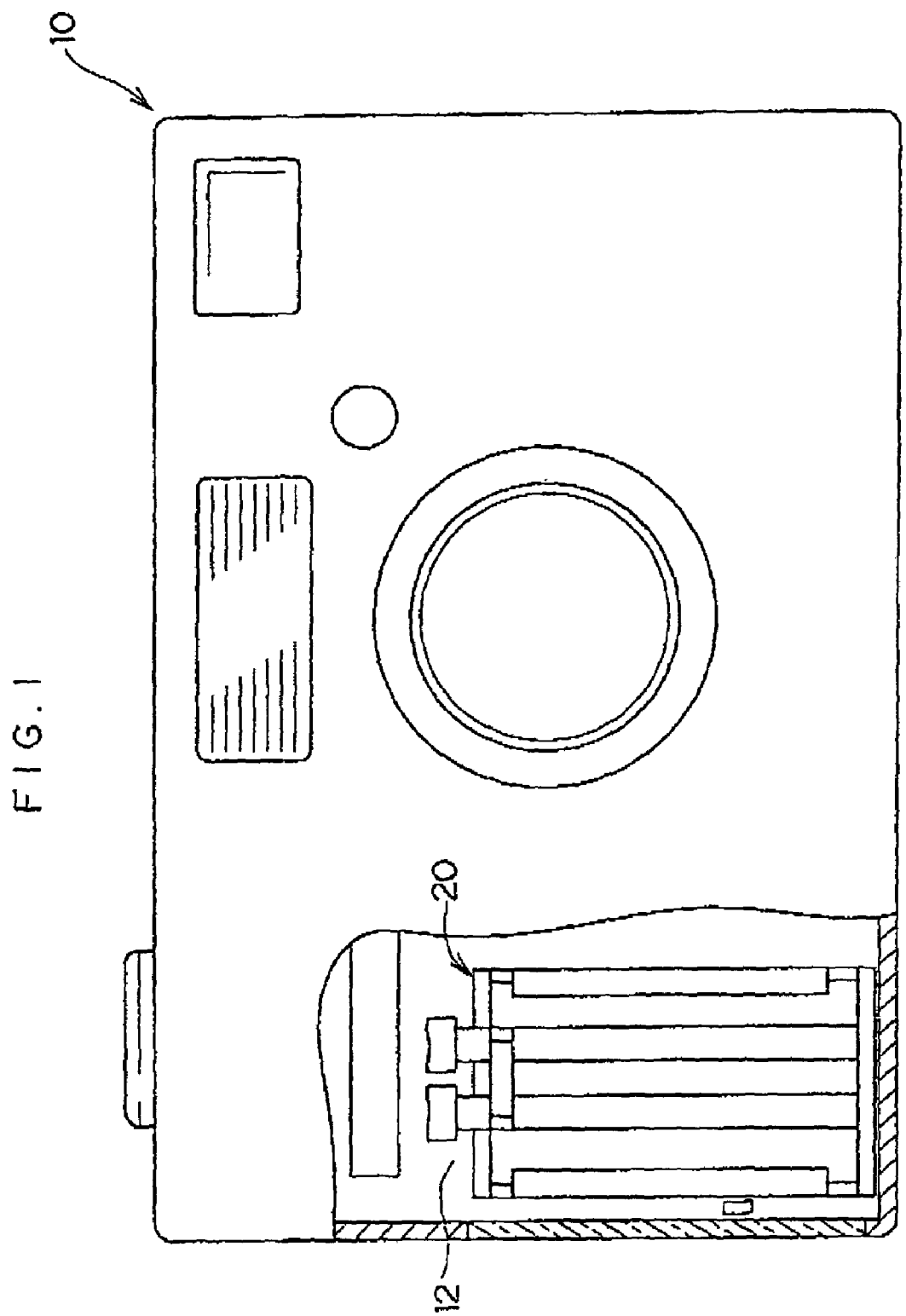
FIG. 1 is a front view showing a digital camera to which a fuel cell relating to a first embodiment of the present invention is attached.

As shown in FIG. 1, a direct methanol fuel cell (hereinafter, referred to as "fuel cell") 20 is attached to a mounting section 12 of a digital camera 10.

Figure 2:
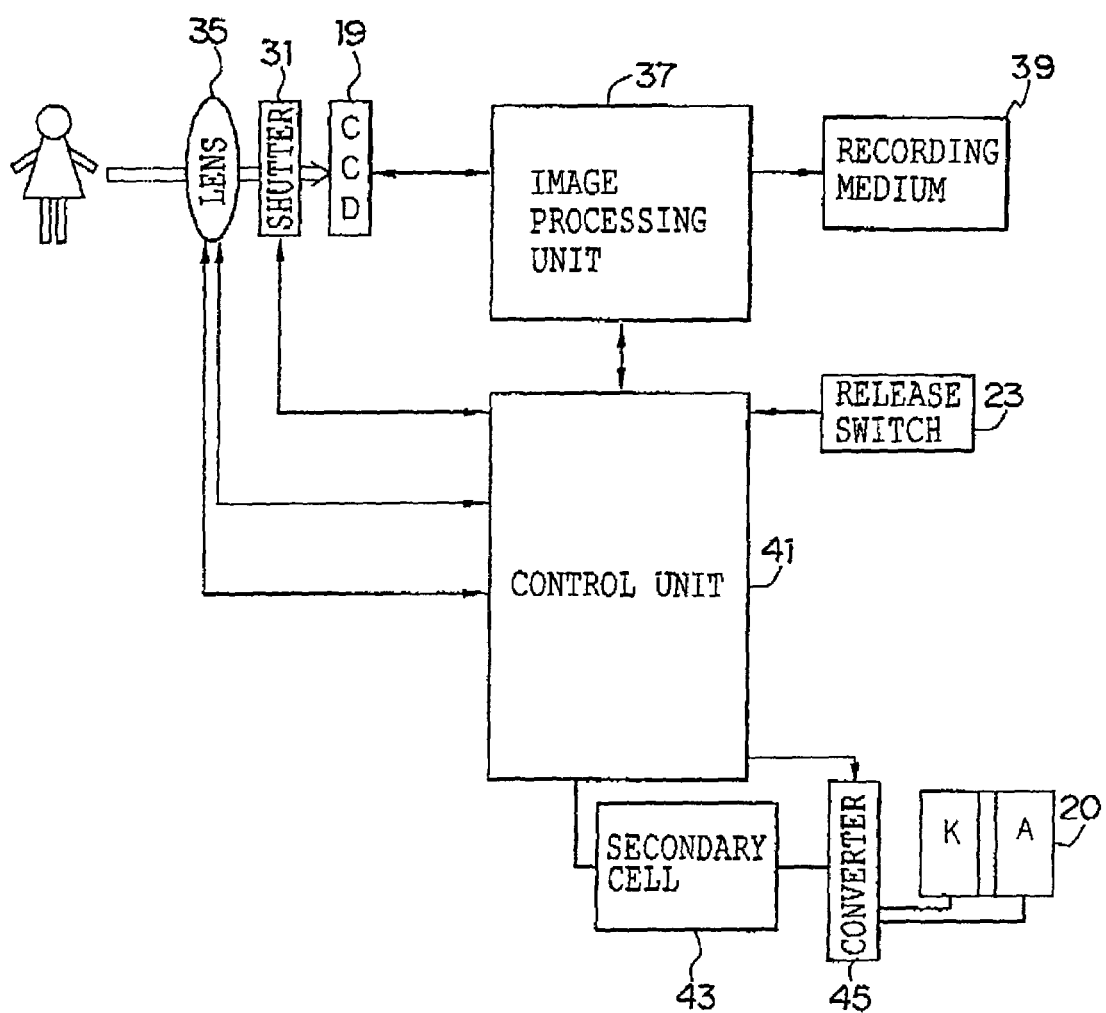
FIG. 2 is a circuit diagram of the digital camera provided with the fuel cell of FIG. 1.
Figure 3:
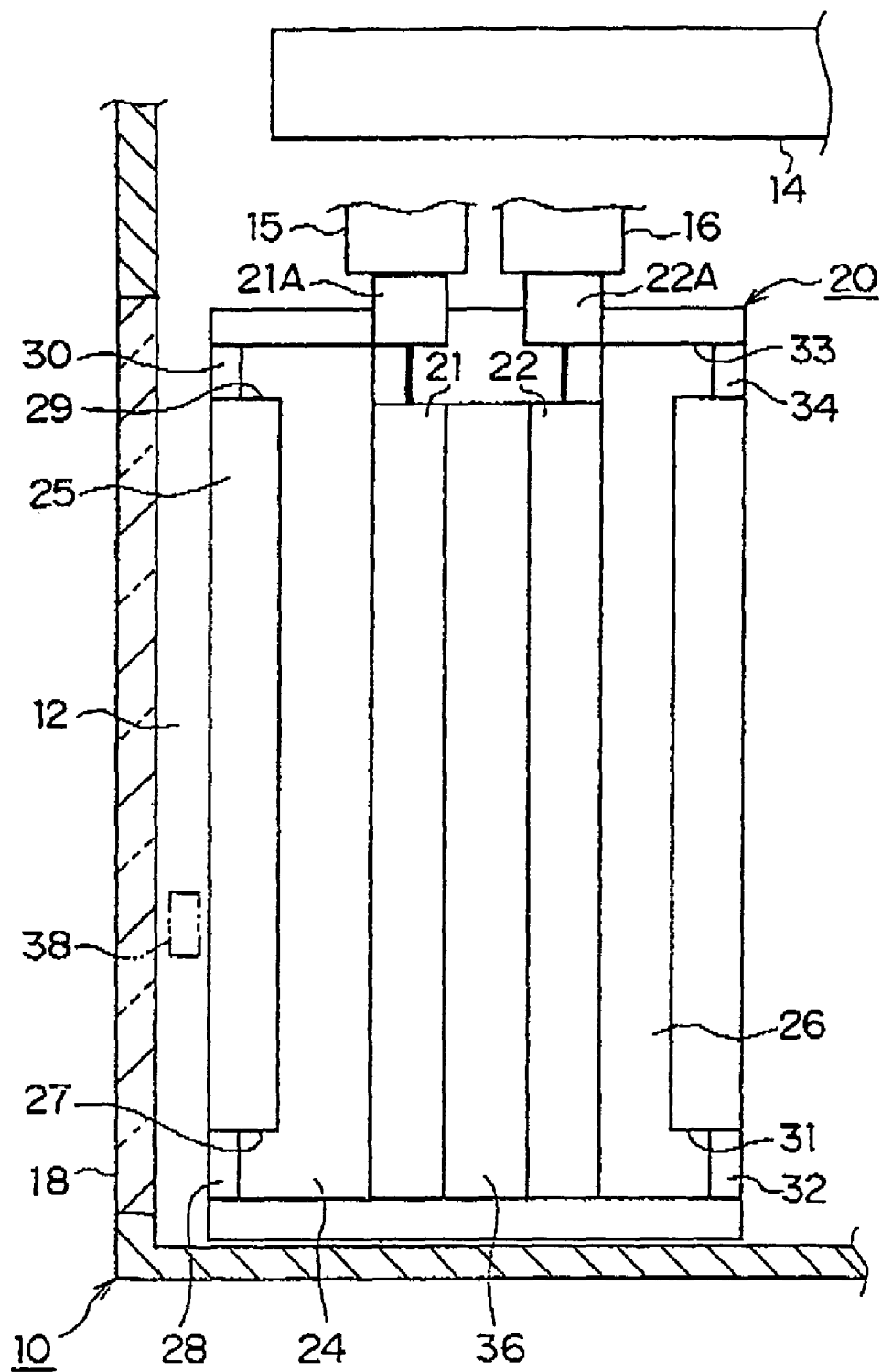
FIG. 3 is a cross-sectional view showing a schematic structure of an electronic device to which the fuel cell of FIG. 1 is attached.

FIG. 2 shows a circuit diagram of a digital camera 10 relating to the present embodiment. When a release switch 23 is pushed, a shutter 31 is opened so that light rays entered through a lens 35 are converged on a CCD 19 to form an image thereon, and the resulting optical data is converted to electrical image data. The image data is transmitted to an image processing unit 37, and subjected to image processing therein. The image data that has been processed in the image processing unit 37 is stored in a recording medium 39.

The respective parts that constitute the digital camera 10 are controlled by a control unit 41. A secondary cell 43 is connected to this control unit 41, and the respective parts constituting the digital camera 10 is activated by electrical energy buffered in the secondary cell 43.

When the electrical energy buffered in the secondary cell 43 is insufficient, the control unit 41 activates a converter 45 to generate power in the fuel cell 20. After electrical energy has been supplied from the fuel cell 20 to complete the charging process of the secondary cell 43, the converter 45 is stopped so as to stop the power generation of the fuel cell 20.

As shown in FIGS. 3 to 5B, the fuel cell 20 is designed in such a manner that methanol, that is, a fuel, is directly supplied to a cathode (fuel electrode) 21, while air is supplied to an anode (air electrode) 22, so that power is generated. Further, the fuel electrode 21 contains a catalyst (Pt/Ru), and the air electrode 22 contains a catalyst (Pt).

Here, the fuel electrode 21 and air electrode 22 of the fuel cell 20 are electrically connected to a ground terminal 15 and a power supply terminal 16 respectively. Moreover, the ground terminal 15 and the power supply terminal 16 are electrically connected to a printed substrate 14 so that power (electric energy) is supplied from the fuel cell 20 to electronic parts on the printed substrate 14, not shown.

A fuel chamber 24 which houses fuel is placed on the fuel electrode 21 side of the fuel cell 20. An air chamber 26 which houses air is placed on the air electrode 22 side of the fuel cell 20. A fuel-supply cap 28 which allows the fuel chamber 24 to store the fuel is placed at an inlet 27 of the fuel chamber 24. A filter 30 which externally emits carbon dioxide ($CO_2$) is placed at an outlet 29 of the fuel chamber 24. Moreover, the outer wall 25 of the fuel chamber 24 is formed by a transparent material.

Filters 32 and 34 are respectively attached to an inlet 31 and an outlet 33 of the air chamber 26. Moreover, an oxygen tank and a drain tank, not shown, are respectively connected to portions corresponding to the filters 32 and 34.

Furthermore, between the air chamber 26 and the fuel chamber 24, a fuel electrode 21 and an air electrode 22, each of which constitutes one portion of the cell unit, are placed with a proton conductive membrane 36 serving as an electrolyte membrane sandwiched in between. Here, an external terminal 21A of the fuel electrode 21 and an external terminal 22A of the air electrode 22 are placed in the fuel cell 20. The external terminals 21A and 22A are electrically connected to the ground terminal 15 and the power-supply terminal 16 respectively.

In the fuel cell 20, methanol is designated as a specified fuel to be injected or supplied to the fuel chamber 24.

Neutral methanol, which is a transparent colorless liquid, and soluble to water, is poisonous to the human body. In an embodiment shown in FIGS. 4A and 4B, fuel 40, prepared by adding water ($H_2O$) and a Bromothymol Blue solution (BTB solution) serving as a colorant and an indicator to methanol, is supplied to the fuel chamber 24, and housed therein.

The reason why the BTB solution is added to methanol is because a color is applied thereto. In other words, when the BTB solution is added to transparent colorless methanol, the methanol is colored into green. Here, the initial color of the fuel 40 is set to green because this color is different from the orange color of gasoline and substantially faint yellow color of kerosene, thereby making it possible to prevent erroneous confirmation and mixture with gasoline and kerosene that are different types of fuel.

Next, referring to FIGS. 4A and 4B, the following description will discuss functions of the fuel cell 20 relating to the present embodiment. First, the fuel 40, prepared by adding the BTB solution serving as a colorant and water to methanol, is supplied into the fuel chamber 24 through the inlet 27, and the inlet 27 is closed by the fuel-supply cap 28. Further, air is supplied into the air chamber 26 through the filter 32 (inlet 31).

Then, the fuel 40 is decomposed into hydrogen ions, electrons and carbon dioxide ($CO_2$) through a catalytic reaction at the fuel electrode 21. The hydrogen ions are transferred to the air electrode 22 through the proton conductive membrane 36; however, electrons are not allowed to pass through the proton conductive membrane 36, and allowed to flow between the external terminals 21A and 22A so that an electric current is generated. Moreover, when hydrogen ions and the like, which have passed through the proton conductive membrane 36, are catalyst-burned by oxygen in the air electrode 22, water ($2H_2O$) is generated.

In other words, the above-mentioned cell reaction is represented by "$CH_3OH+3/2.O_2 \rightarrow CO_2+2H_2O$", and carbon dioxide is discharged to the fuel chamber 24 side, while water (water vapor) is discharged to the air chamber 26 side. Here, carbon dioxide has such a property that it is easily dissolved into water.

When carbon dioxide, discharged on the fuel chamber 24 side, is dissolved in water in the fuel 40, the fuel 40 colored into green (indicated by a hatched portion with diagonal upward slanting lines to the right in FIG. 4A) with the BTB solution becomes acidic to be changed (i.e., colored) into yellow (indicated by a hatched portion with diagonal upward slanting lines to the left in FIG. 4B). Moreover, since the amount of generation of carbon dioxide increases in response to the consumption of the fuel 40, the amount of dissolution of carbon dioxide to water also increases, with the result that the acidity becomes higher. For this reason, the color of the fuel 40 changes in response to the amount of consumption of the fuel 40.

According to the present embodiment, since the color of the fuel 40 is changed in response to the amount of consumption of the fuel 40, the amount of consumption of the fuel 40 is easily confirmed by visually recognizing the color of the fuel 40 in addition to the confirmation based upon the liquid face level of the fuel 40. Thus, it becomes possible to make the device more convenient. Here, when the user has determined that the fuel 40 should be refilled, the colored fuel 40 is again supplied to the fuel chamber 24.

Moreover, relating to the present embodiment, the BTB solution is added to methanol which is the designated fuel so as to make it different from fuels of the other kinds; therefore, it is possible to prevent any fuel other than methanol, for example, gasoline or kerosene, from being supplied. Here, since the BTB solution is sensitive in the acidic reaction in comparison with the litmus solution, the fueler 40 is quickly changed in its color.

Moreover, in the present embodiment, a color sensor 38 (indicated by a hypothetical line in FIG. 3), which detects the color of the fuel 40, may be installed, or a reference mechanism (e.g., color identification list and the like), which indicates corresponding color changes in the fuel 40, may be installed. Moreover, in the present embodiment, the outer wall of the digital camera 10 that faces the outer wall 25 of the fuel chamber 24 may be formed as a transparent member 18. In this case, the user is allowed to recognize a change in the color of the fuel 40 even from the outside of the digital camera 10 through the transparent member 18.

Referring to FIGS. 5A and 5B, the following description will discuss a case in which a litmus solution is used as the colorant and the indicator. Here, with respect to the same contents as the example shown in FIGS. 4A and 4B, the description thereof is omitted. In comparison with the BTB solution, the litmus solution is slow in the above-mentioned acidic reaction. For this reason, in the present embodiment, a pressure valve 42, which is a pressure-applying mechanism, is placed at the outlet 29 of the fuel chamber 24.

Moreover, the amount of dissolution of carbon dioxide to water increases as the pressure increases, and the acidity becomes higher. In other words, when no pressure is applied to the inside of the fuel chamber 24, carbon dioxide exhibits a weak acidic property, making the reaction of the litmus solution slower. Therefore, in the present embodiment, in order to increase the reaction efficiency of the litmus solution, a pressure is applied to the inside of the fuel chamber 24.

When a purple litmus solution is added to transparent colorless methanol, the fuel 40 is colored into purple (indicated by a hatched portion with diagonal upward slanting lines to the right in FIG. 5A). Moreover, as described above, when carbon dioxide emitted on the fuel chamber 24 side is dissolved in water of the fuel 40, the fuel 40, colored into purple by the litmus solution, becomes acidic to be changed into red (indicated by crossing lines in FIG. 5B).

In other words, in the present embodiment, since the pressure valve 42 applies a pressure to the inside of the fuel chamber 24, the amount of carbon dioxide to be dissolved in water in the fuel 40 increases. Consequently, it becomes possible to rapidly change the color of the fuel 40 appropriately in accordance with the amount of consumption of the fuel. Additionally, the above-mentioned pressure valve 42 may have a function for adjusting the pressure inside the fuel chamber 24 to a fixed value, a function for desirably changing the pressure inside the fuel chamber 24 or a safety function for releasing the fuel chamber 24 before the pressure inside the fuel chamber 24 has reached a dangerous zone.

Moreover, in addition to the pressure inside the fuel chamber 24, the dissolution of carbon dioxide to water in the fuel 40 is also varied due to temperatures; therefore, a heater or the like may be placed in the fuel chamber 24 or in the vicinity of the fuel chamber 24. In this case, a temperature sensor, which detects the temperature (reaction temperature) of the fuel 40 inside the fuel chamber 24, is installed, and based upon this temperature sensor, the temperature adjustment of the above-mentioned heater may be carried out.

Figure 6B:
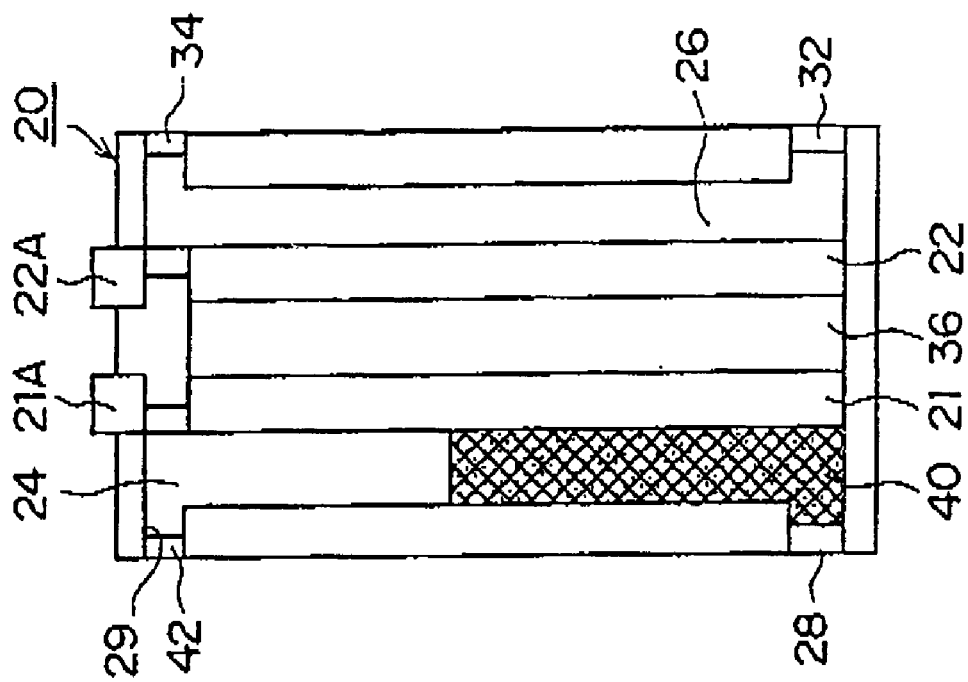
FIG. 6B is a cross-sectional view showing a state in which a fuel chamber shown in FIGS. 1 and 3 is filled with methanol, water and a dye.
Figure 6A:
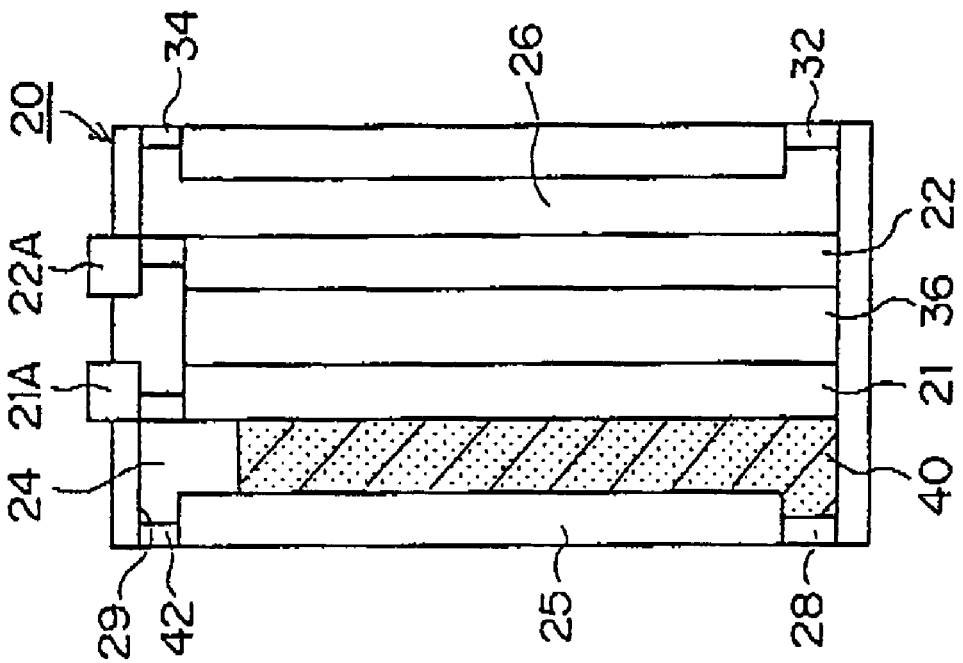
FIG. 6A is a cross-sectional view showing a state in which a fuel chamber shown in FIGS. 1 and 3 is filled with methanol, water and a dye.

Referred to FIGS. 6A and 6B, the following description will discuss a case in which a dye is used as the colorant. Here, with respect to the same contents as the example shown in FIGS. 4A and 4B as well as FIGS. 5A and 5B, the description thereof is omitted.

For example, a red dye is added to transparent colorless methanol, the fuel 40 is colored into red (indicated by a hatched portion with diagonal upward slanting lines to the left in FIG. 6A). As power is generated in the fuel cell 20, the fuel 40 inside the fuel chamber 24 decreases, making the concentration of the dye higher to change the red color of the fuel 40 to a deeper red color (indicated by crossing lines in FIG. 5B).

With respect to the fuel cell 20, the first embodiment has exemplified a case in which a colorant is preliminarily added to the fuel 40. However, a colorant may be preliminarily put inside the fuel chamber 24, and dissolved into the fuel 40 that is supplied thereto; thus, this method also provides the same effects.

Next, a direct methanol fuel cell (hereinafter referred to as fuel cell) 50 relating to a second embodiment of the invention will be described. Here, members that are the same as those of the first embodiment are indicated by the same reference numeral, and the description thereof is emitted.

Figure 7:
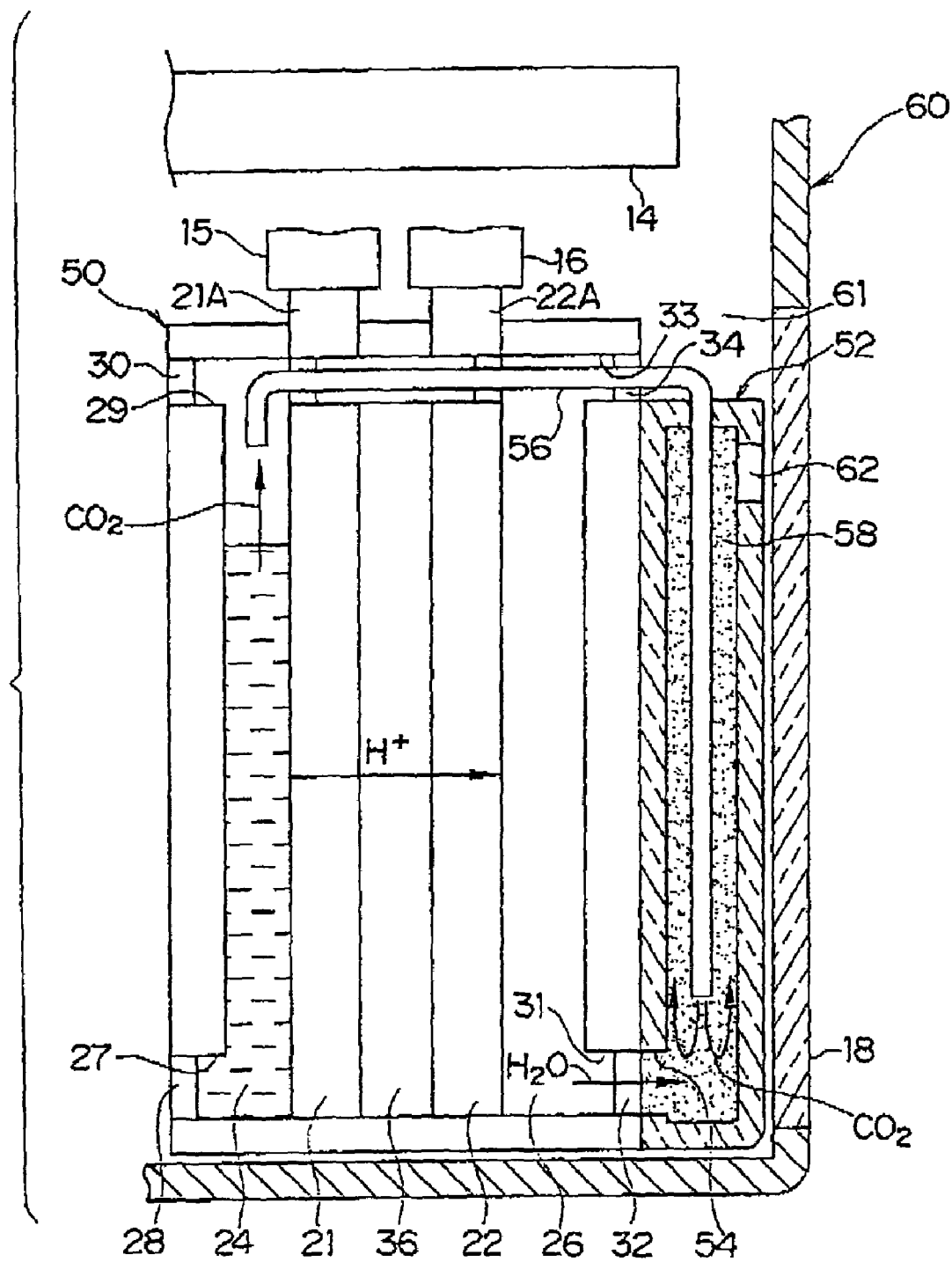
FIG. 7 is a cross-sectional view that shows a fuel cell relating to a second embodiment of the invention.

As shown in FIG. 7, a fuel cell 50 is attached to a mounting section 61 of a digital camera 60 with the air chamber 26 side thereof facing a transparent member 18 of the digital camera 60. A recovery section 52 for recovering by-products, such as carbon dioxide ($CO_2$) generated in the fuel chamber 24 and water ($H_2O$) generated in the air chamber 26, is provided adjacent to the air chamber 26 in a manner so as to face the transparent member 18, in the fuel cell 50.

An insertion hole 54 is formed at a lower portion of the recovery section 52 in a manner so as to face a filter 32. Gases are exchanged between the air chamber 26 and the recovery section 52 through the filter 32. Moreover, a discharge pipe 56 that is extended from the fuel chamber 24 is inserted to the recovery section 52 so that gases are sent from the fuel chamber 24 to the recovery section 52.

Moreover, water-absorbing polymer 58 is filled into the recovery section 52. A neutral BTB solution is absorbed in this water-absorbing polymer 58 so that the water-absorbing polymer 58 is colored into green. Here, in the same manner as the first embodiment, the litmus solution may be used in place of the BTB solution.

FIG. 8A shows a state in which the BTB solution is neutral and colored into green after a fuel supply. When the fuel is consumed to generate power, carbon dioxide ($CO_2$) is generated in the fuel chamber 24, while water ($H_2O$) is generated in the air chamber 26, in the same manner as the first embodiment.

Carbon dioxide in the fuel chamber 24 is allowed to flow into the recovery section 52 through the discharge pipe 56, and water inside the air chamber 26 is allowed to flow into the recovery section 52 through the filter 32. In the recovery section 52, carbon dioxide is dissolved in recovered water and water in the BTB solution to make the solution acidic, thereby changing the color of the BTB solution from green into yellow.

Thus, as shown in FIG. 8B, as the amount of the fuel becomes smaller, the entire water-absorbing polymer 58 is changed into yellow; therefore, the remaining amount of the fuel is visually confirmed easily so that it is not necessary to carry out a reading operation of the color by using a color detection sensor and the like. Moreover, since the color of the entire water-absorbing polymer 58 is changed, even when the digital camera 60 is tilted longitudinally or laterally, it is possible to always confirm the color through the transparent member 18.

Moreover, the upper portion of the recovery section 52 is opened through a gas-liquid separation membrane 62, which transmits gas while blocking solution. This arrangement makes it possible to prevent the inner pressure of the recovery section 52 from increasing to an abnormally high level by the carbon dioxide recovered to cause carbon dioxide and water to flow reversely into the fuel chamber 24 or the air chamber 26, and also to prevent the recovery section 52 from bursting.

Figure 9:
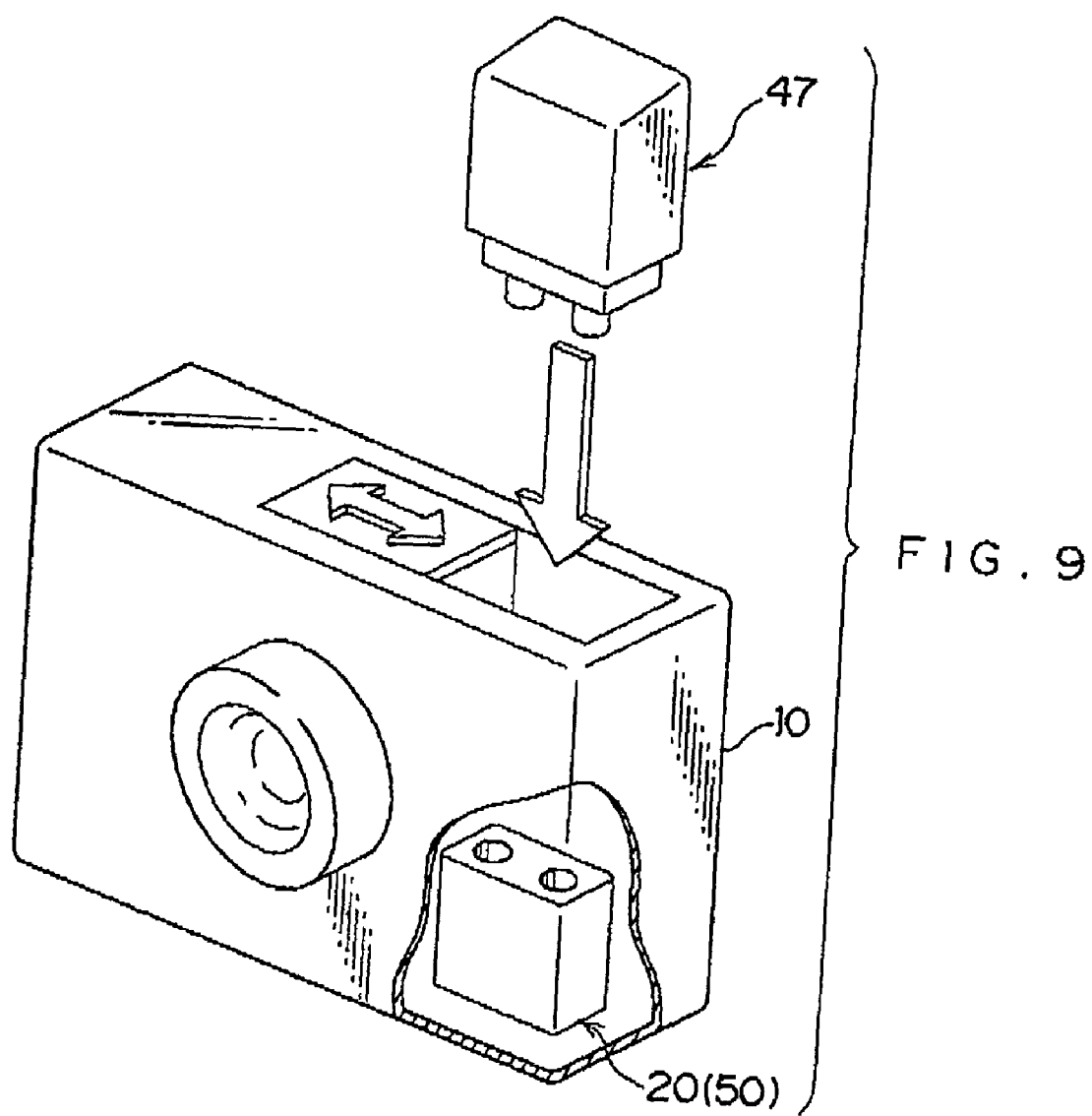
FIG. 9 is a perspective view showing a digital camera that is provided with the fuel cell relating to the first and second embodiments of the invention.
Figure 10:
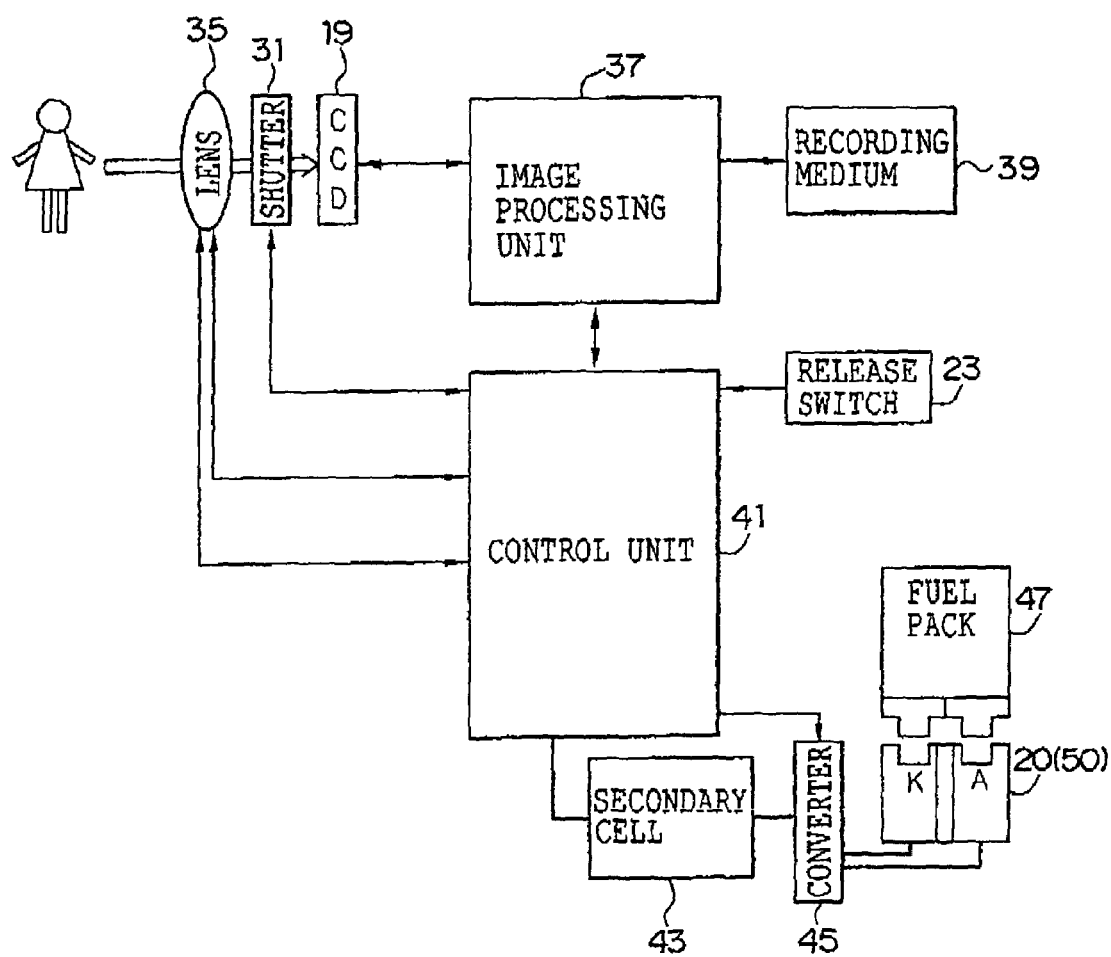
FIG. 10 is a circuit diagram of a digital camera provided with the fuel cell of FIG. 9.

Additionally, the kinds of the fuel and colorant relating to the invention are not limited by those described in the above-mentioned embodiments, and can be desirably changed. Moreover, the above-mentioned embodiments have exemplified a structure in which the fuel is directly supplied to the fuel cell. However, as shown in FIGS. 9 and 10, a structure in which a fuel pack 47 storing fuel is attached to the fuel cell 20 or 50 may be proposed. In this case, a recovery chamber for recovering by-products generated in the fuel cell may be provided in the fuel pack.

Figure 11:
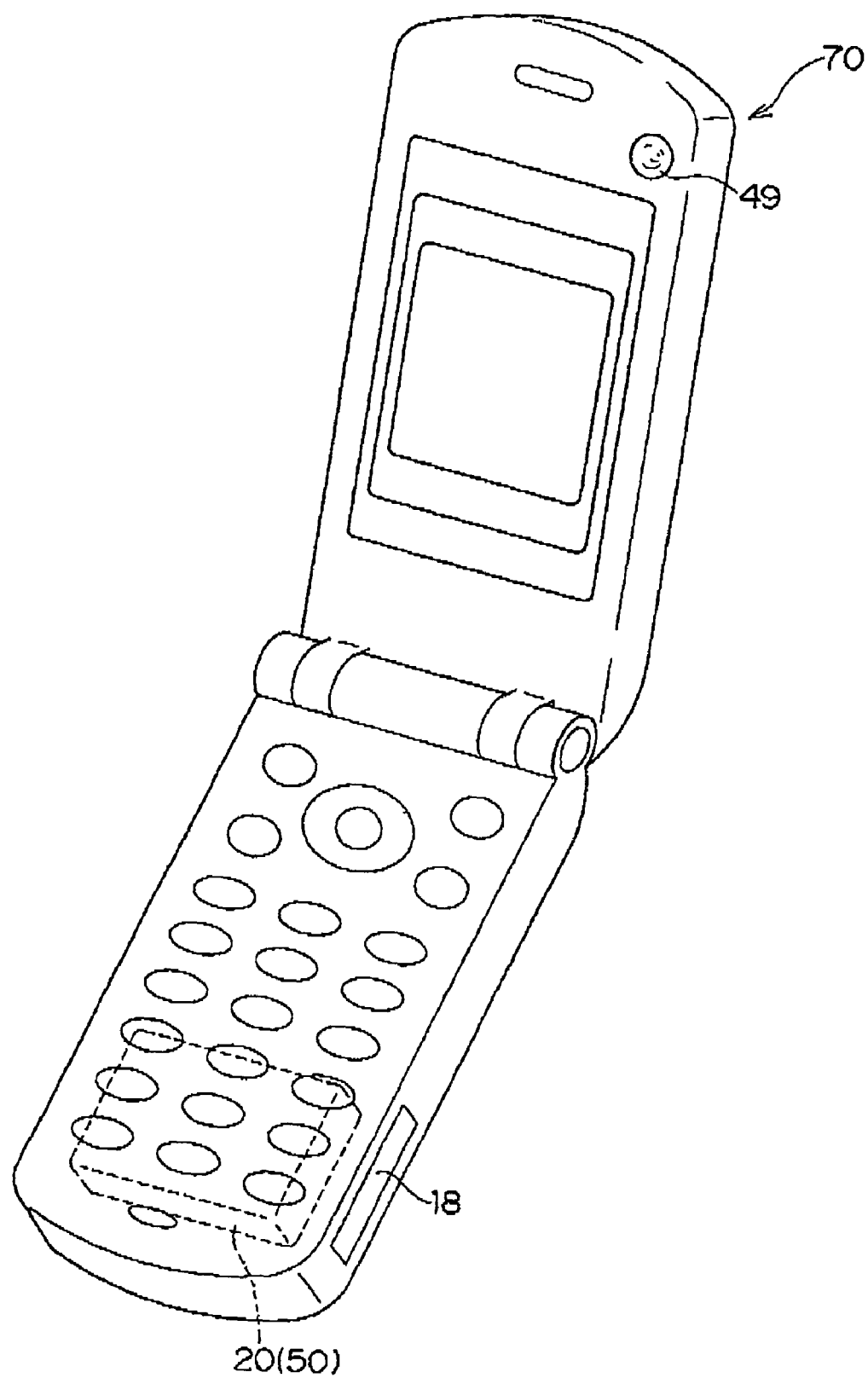
FIG. 11 is a perspective view showing a portable telephone with a camera, which is provided with the fuel cell of FIG. 9.

With respect to the electronic devices or cameras relating to the above-mentioned embodiments, in addition to digital cameras, for example, silver photograph type cameras, digital video cameras, portable telephones, personal computers and PDAs may be listed as applicable devices. As shown in FIG. 11, in the case of a portable telephone 70 with a camera, provided with an image-pickup section 49 which includes a lens, a shutter and the like, a fuel cell 20 or 50 may be placed on a keyboard box 72 side.

As described above, according to the present invention, since the color of the fuel is changed in accordance with the amount of consumption of the fuel, it is possible to easily confirm the amount of consumption of the fuel by visually recognizing the color of the fuel in addition to the liquid surface level of the fuel. Therefore, it is possible to make the device more convenient. Moreover, a colorant used for identifying a fuel of a different kind is added to a designated fuel to be supplied to a fuel cell so that it becomes possible to prevent a fuel of a different kind from being supplied erroneously.

What is claimed is:

1. A fuel cell comprising:
   a cell unit which has a fuel electrode including a catalyst, an air electrode including a catalyst, and an electrolyte membrane which is sandwiched by the fuel electrode and the air electrode;
   a fuel chamber which is disposed at a fuel electrode side, and which stores fuel;
   an air chamber which is disposed at an air electrode side and to which air is supplied; and
   a recovery chamber in which a fuel-side by-product, which is generated by a catalytic reaction of the fuel at the fuel electrode, is recovered,
   wherein a colorant containing an indicator is provided inside of one of the fuel chamber and the recovery chamber and the indicator is based upon the fuel-side by-product.

2. The fuel cell according to claim 1, wherein at least one of the fuel chamber and the recovery chamber has an outer wall which comprises a transparent member.

3. The fuel cell according to claim 1, further comprising a pressure-applying mechanism which applies pressure to the interior of at least one of the fuel chamber and the recovery chamber.

4. The fuel cell according to claim 1, wherein the recovery chamber is provided with a gas-liquid separation membrane.

5. A fuel cell comprising:
a cell unit which has a fuel electrode including a catalyst, an air electrode including a catalyst, and an electrolyte membrane which is sandwiched by the fuel electrode and the air electrode;
a fuel chamber which is disposed at a fuel electrode side, and which stores fuel;
an air chamber which is disposed at an air electrode side and to which air is supplied, wherein:
fuel to which a colorant is added is housed in the fuel chamber, and
a color of the fuel derived from the colorant changes in accordance with an amount of gas generated by a catalytic reaction of the fuel at the fuel electrode.

6. The fuel cell according to claim 5, wherein the gas is allowed to remain in the fuel chamber, and the fuel cell further comprises a pressure-applying mechanism for applying pressure to the interior of the fuel chamber to dissolve the gas.

7. The fuel cell according to claim 5, wherein the gas is carbon dioxide, and the colorant is an indicator whose color is changed by carbon dioxide.

8. A fuel cell comprising:
a cell unit which has a fuel electrode including a catalyst, an air electrode including a catalyst, and an electrolyte membrane which is sandwiched by the fuel electrode and the air electrode;
a fuel chamber which is disposed at a fuel electrode side, and which stores fuel;
an air chamber which is disposed at an air electrode side and to which air is supplied; and
a recovery chamber in which a fuel-side by-product, which is generated by a catalytic reaction of the fuel at the fuel chamber, is recovered,
wherein an absorbing member which absorbs a colorant, is housed in the recovery chamber, and a color of the absorbing member derived from the colorant changes in accordance with an amount of the fuel-side by-product which has been recovered.

9. The fuel cell according to claim 8, wherein the recovery chamber recovers an air-side by-product generated at the air electrode.

10. The fuel cell according to claim 9, wherein the fuel-side by-product is carbon dioxide, the air-side by-product is water, and the colorant is an indicator whose color is changed by carbon dioxide.

11. The fuel cell according to claim 10, wherein the indicator comprises a Bromothymol Blue solution.

12. The fuel cell according to claim 10, wherein the indicator comprises a litmus solution.

13. The fuel cell according to claim 10, wherein at least one of the fuel chamber and the recovery chamber has an outer wall which comprises a transparent member.

14. The fuel cell according to claim 13, further comprising a detection mechanism which detects the color of the colorant.

15. The fuel cell according to claim 8, wherein the recovery chamber is provided with a gas-liquid separation membrane.

16. An electronic device to which the fuel cell according to claim 1 can be installed.

17. A portable terminal to which the fuel cell according to claim 1 can be installed.

18. A camera to which the fuel cell according to claim 1 can be installed.

* * * * *